United States Patent [19]
Arai

[11] Patent Number: 5,105,619
[45] Date of Patent: Apr. 21, 1992

[54] REGENERATION SYSTEM FOR PARTICULATE TRAP

[75] Inventor: Minoru Arai, Fujisawa, Japan
[73] Assignee: Isuzu Motors Limited, Tokyo, Japan
[21] Appl. No.: 478,951
[22] Filed: Feb. 12, 1990
[30] Foreign Application Priority Data Feb. 13, 1989 [JP] Japan .................................. 1-33078

[51] Int. Cl.⁵ .............................................. F01N 3/02
[52] U.S. Cl. ...................................... 60/286; 55/283; 55/DIG. 30; 60/277
[58] Field of Search .................. 60/274, 286, 277; 55/283, DIG. 30

[56] References Cited
U.S. PATENT DOCUMENTS 4,604,868  8/1986  Nomoto .................. 60/286
4,665,690  5/1987  Nomoto .................. 60/288

FOREIGN PATENT DOCUMENTS 101518    6/1984  Japan .
62-49610  3/1987  Japan .

Primary Examiner—Douglas Hart
Attorney, Agent, or Firm—Staas & Halsey

[57] ABSTRACT

A regeneration system for a particulate trap provided in an exhaust pipe of an engine in which the temperature rising rate of the front temperature of the trap is calculated from the output of a temperature sensor to control the air flow from an air pump, so that the temperature rising rate may be confined within a predetermined range and the front temperature may be raised up to a predetermined ignition value.

5 Claims, 4 Drawing Sheets

NON-AIR INTRODUCTION

AIR INTRODUCTION

REGENERATION SYSTEM FOR PARTICULATE TRAP

BACKGROUND OF THE INVENTION

The present invention relates to a regeneration system for a particulate trap, and in particular to a system for controlling the trap temperature upon the regeneration of the particulate trap (hereinafter abbreviated as trap).

There is shown in FIG. 1 a conventionally known system for controlling the trap temperature upon the regeneration by means of an electric heater as a thermal source. It is to be noted that the regeneration of the trap means the reproduction of the trap by burning particulates (particles) accumulated in the trap while a vehicle is running.

In the figure, in an exhaust pipe 1 of an engine (not shown) is provided a well-known particulate trap 2 connected to the exhaust pipe 1 and having an inlet, at the front of which an electric heater 3 is installed. A switch relay 4 turns on a power source for the electric heater 3, a thermal sensor 5 is provided inside the trap 2 for sensing the temperature at the front of the trap 2, and an air pump 6 supplies air flow to the trap 2.

At the front of the trap 2 in the exhaust pipe 1 is provided a trap inlet valve 7 for controlling the flow of exhaust gas from the engine flowing into the trap 2, while in a bypass pipe 8 for bypassing the exhaust gas out of the trap 2 is provided a bypass valve 9 for controlling the flow of the exhaust gap into the bypass pipe 8. The inlet valve 7 and the bypass valve 9 are controlled by vacuum solenoid switch valves 10 and 11 respectively.

A pressure sensor 12 is provided for sensing the pressure difference between the front and rear of the trap 2, and a controller (CPU) 13 receives the sensed signal from the sensor 5 and supplies control signals to the relay 4 and the switching valves 7 and 9.

In the conventional operation by the controller 13, when it is decided from the output of the pressure sensor 12 that enough particulates are accumulated in the trap 2 for the regeneration time thereof, the bypass valve 9 is opened, the inlet valve 7 is closed, and the heater 3 is electrically energized by the switch relay 4 to raise the trap temperature up to a predetermined ignition temperature for the accumulated particulates.

Such an electrical heater used for raising the temperature of the trap front is generally of a sheath type, which has a rod-like shape (with a diameter of 5~ 6 mm) as shown in FIG. 2, so that in the event of null air flow as shown in FIG. 2(a) the generated heat of the electric heater 3 is well conducted around the heater 3 but scarcely conducted far from the heater 3, with the result that the trapped particulates are non-uniformly burnt.

Then, in the event of air flow given as shown in FIG. 2(b), calories dissipated around the heater are carried onto the surface of the trap, resulting in good thermal conduction.

Therefore, when the front temperature of the trap reaches the particulate ignition temperature, the controller 13 initiates the supply of air flow by driving the air pump 6 for uniform and transmissible regeneration.

Such a system employing an air pump for transmissible regeneration is disclosed e.g. in Japanese Utility Model Application laid-open No. 62-49610 of this applicant, while there is another system introducing air at the same time as the commencement of the energization of the heater as disclosed in Japanese Patent Application laid-open No. 59-101518.

After this, when a predetermined time interval has lapsed from the energization of the heater 3, the air supply is stopped, the bypass valve 9 is closed, and the inlet valve 7 is opened, thereby reopening the ordinary trap operation.

In such a conventional regeneration operation for a particulate trap, the exhaust gas of the engine passes through the bypass pipe 8 during the regeneration time interval.

However, although the trap inlet valve 7 is closed, there is actually a gap, between the inlet valve 7 and the exhaust pipe 1, from which the exhaust gas leaks. Furthermore, the exhaust back pressure becomes high when the revolution (load) of the engine is high, so that the leak amount becomes large correspondingly, whereby the surfaces of the heater 3 and the trap 2 are cooled because of the addition of the introduced air amount from the air pump 6, disadvantageously resulting in a delayed thermal increase until the ignition of the particulates and in a worsened thermal efficiency.

On the other hand, if the introduced air amount from the air pump 6 is decreased to hasten the thermal increase unduly, the trap 2 per se will be melted.

SUMMARY OF THE INVENTION

Accordingly, it is an object of the present invention to provide a regeneration system for a particulate trap which is capable of making the temperature of the front of the trap uniform by air supply to hasten the ignition of particulates regardless of the exhaust gas leak at the trap inlet valve.

For the achievement of the above noted object, a regeneration system for a particulate trap provided in an exhaust pipe of an engine according to the present invention comprises; sensing means for sensing the temperature at the front of said trap, an air pump for supplying air flow for the front of said trap, heating means for electrically heating said trap, and control means for energizing said heating means and said air pump upon the regeneration of said trap and then for calculating the temperature rising rate of the front temperature of said trap from the output of said sensing means to control the air flow from said air pump, so that said temperature rising rate may be confined within a predetermined range, thereby raising the front temperature of said trap up to a predetermined ignition value.

In the present invention, after the regeneration process for the trap is initiated as usual, the control means senses the front temperature of the trap by the temperature sensing means provided at the front of the trap to calculate the temperature rising rate.

Then, the front temperature is controlled to increase so that the rising rate of the front trap temperature may be confined within a predetermined range α-β as shown in FIG. 3.

This range α-β can be determined from the graph shown in FIG. 4 in which the abscissa calibrates air flow rate while the ordinate calibrates variation of temperature distribution, temperature rising rate dT/dt, and rising time $P_1$ until a predetermined ignition temperature.

In FIG. 4, air flow rate ① indicates the cross point of temperature distribution curve I and variation degree A, assuming that the variation of preferable temperature should be lower than A. Air flow rate ② indicates the cross point of temperature rising rate curve II and a temperature rising rate B assuming that a preferable temperature rising rate dT/dt after the initiation of the regeneration of the trap should be lower than B. Air flow rate ③ indicates the cross point of temperature rising time curve III and a temperature rising time C assuming that a preferable temperature rising time $P_1$ up to a predetermined ignition temperature should be lower than C.

From these curves, it is found that preferable air flow rate for temperature control takes the range F between ①-②.

Therefore, the temperature rising rate dT/dt with respect to this combination of air flow rates ①, ② corresponds to α, β respectively.

Thus, the front temperature is controlled to increase so that the rising rate of the trap front temperature may be confined within a predetermined range α-β, whereby the temperature distribution of the trap front is made uniform at the time of the ignition of particulates and therefore the ignition temperature of particulates can be obtained without an unduly delayed or hastened thermal transmission to the particulates in the trap.

BRIEF DESCRIPTION OF THE DRAWINGS

The present invention will now be more apparent to those skilled in the art from the attached drawings in which.

Throughout the figures, same reference numerals indicate identical or corresponding portions.

DETAILED DESCRIPTION OF THE PREFERRED EMBODIMENTS

Figure 1:
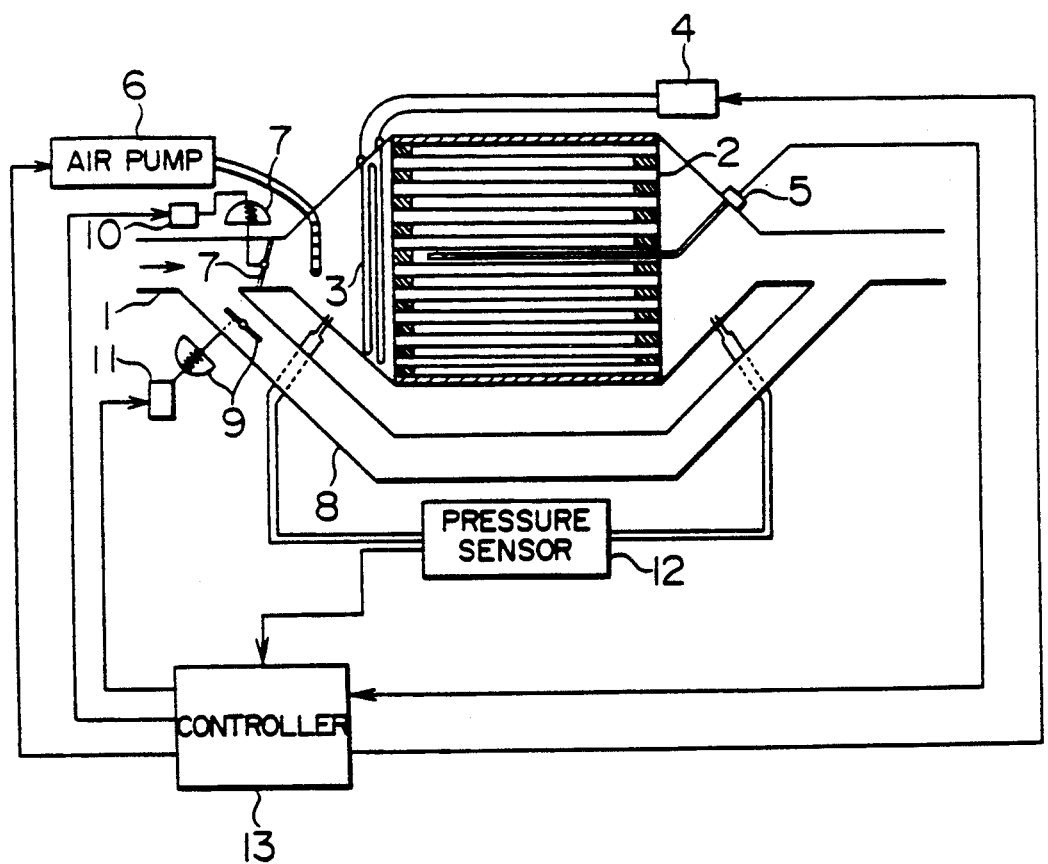
FIG. 1 shows a system arrangement diagram of a regeneration system for a particulate trap common to the present invention and a prior art.
Figure 2A:
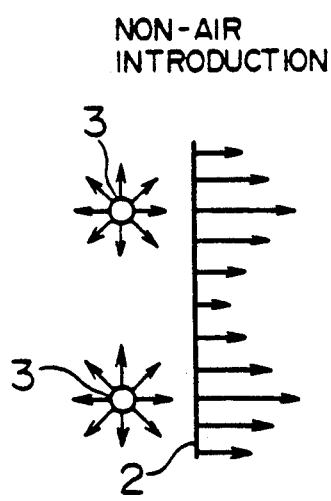
FIGS. 2(a) and 2(b) are diagrams for describing the relationship between an electric heater and its introducing air.
Figure 2B:
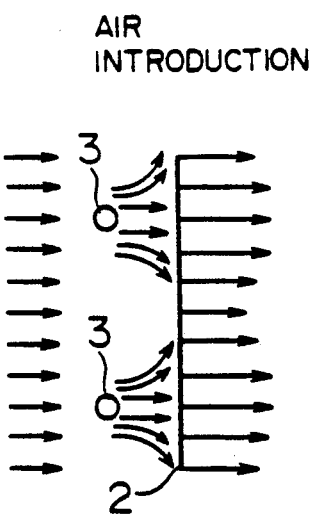

The arrangement of a regeneration system for a particulate trap according to the present invention may be the same as that in FIG. 1. Therefore, the description of the arrangement of the system is omitted here.

Figure 5:
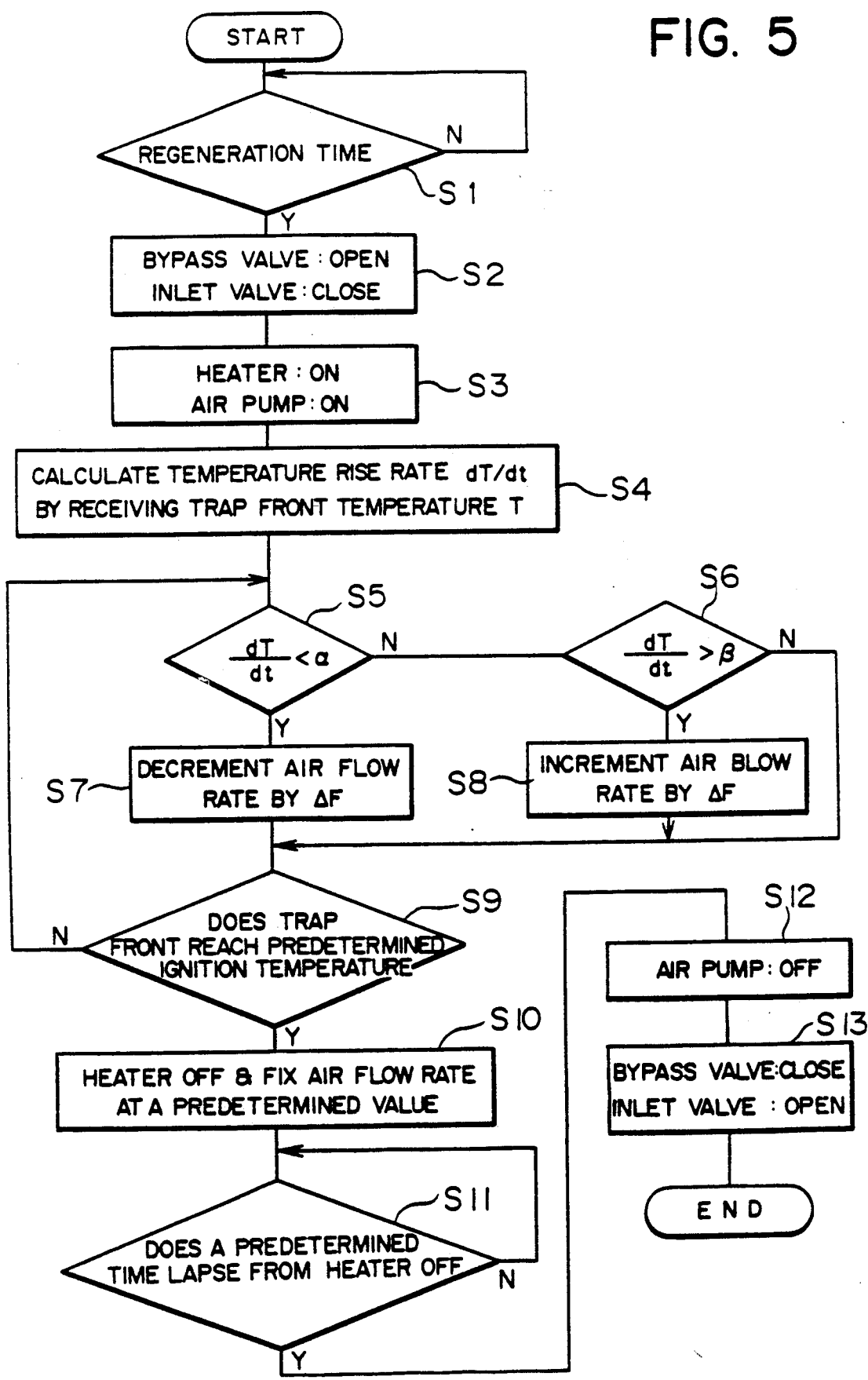
FIG. 5 shows a program flow chart executed by a controller shown in FIG. 1 according to the present invention; and, FIG. 6 shows a diagram showing the relationship between the increase or decrease of air amount and temperature rise rates according to the present invention.

FIG. 5 shows a flow chart indicating one embodiment of a program stored in and executed by the controller 13 shown in FIG. 1, so that the operation of the system according to the present invention will be described hereinafter with reference to the flow chart in FIG. 5.

First of all, the controller 13 decides a suitable time of regeneration by the detection of the rise of the exhaust pressure of the trap 2 from the output of the pressure sensor 12 (Step S1 in FIG. 5). It is to be noted that besides the pressure detection, a predetermined distance run or a predetermined integration of engine rotation of a car may be used for the decision of the regeneration time.

At the time when the regeneration should be done, the controller 13 opens the bypass valve 9 by a duty ratio control for the switching valve 11 thereby to control the switching valve 9 with the duty ratio to close the inlet valve 7 of the trap 2 (Step S2).

Then, the energization for the electric heater 3 is initiated by the switching relay 4 to raise the temperature inside the trap while the air pump 6 is made ON to initiate the air supply to the front of the trap 2 (Step S3).

Hereby, the trapping operation of the trap 2 is interrupted and the regeneration process is started.

The controller 13 then inputs the sensed output of the thermal sensor 5, i.e. the trap front temperature T, which temperature being sequentially input per each period of the program to calculate the temperature rise rate dT/dt (Step S4).

Figure 3:
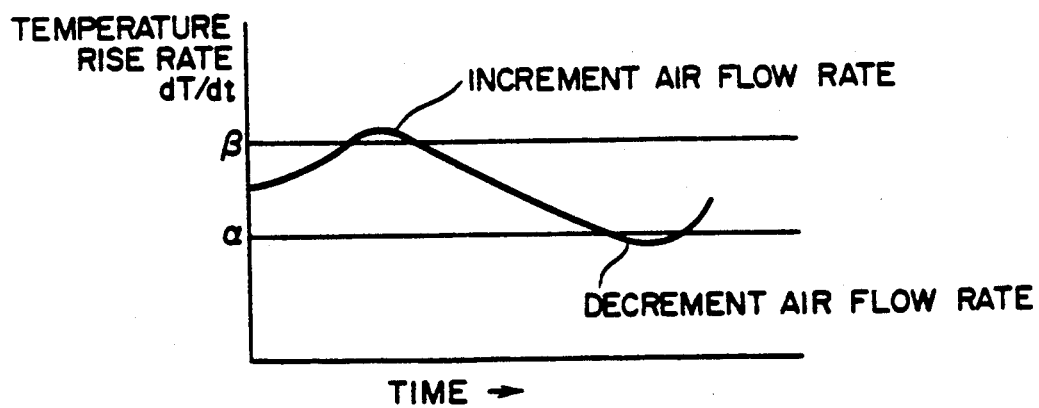
FIGS. 3 and 4 show characteristic curve diagrams for describing the functional principle of the present invention.
Figure 4:
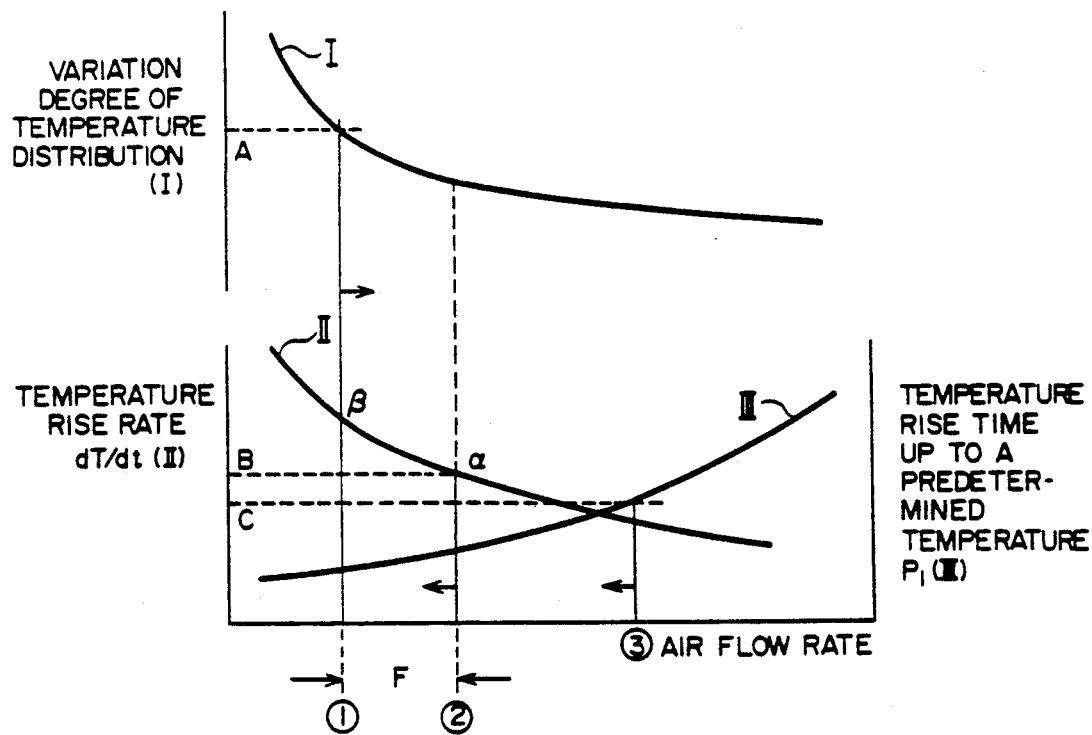

Based on the calculated temperature rise rate dT/dt, control is made so that the temperature rise rate may be confined within a predetermined range α-β as shown in FIGS. 3, 4 and as aforementioned.

Figure 6:
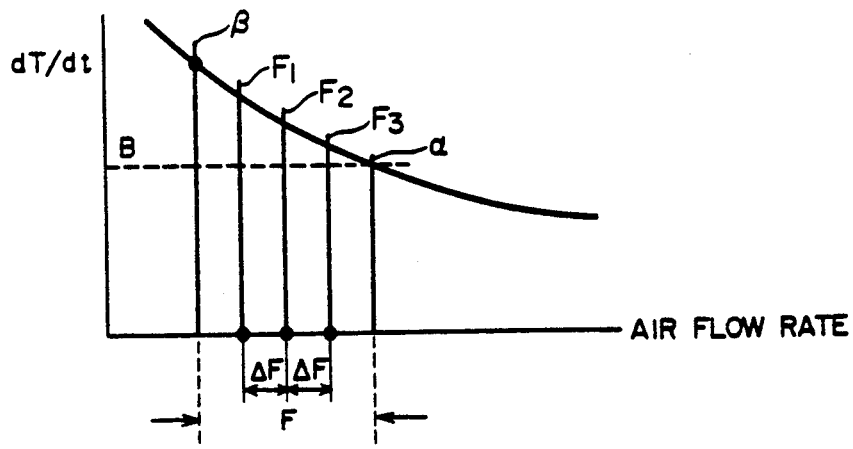

Namely, whether or not the temperature rise rate dT/dt is below the predetermined value α is checked (Step S5), and if the temperature rise rate does not reach the predetermined value α, which indicates the air flow rate being large and so the temperature failing to rise, the flow rate of the air pump 6 is controlled to decrement by ΔF from e.g. $F_3$ to $F_2$ as shown in FIG. 6.

Then, whether or not the temperature of the trap front reaches a predetermined value for ignition is checked (Step 9), and if it does not reach the ignition temperature because of a low temperature rise rate dT/dt, the program will return to Step S5.

If in Step S5 it still does not reach the predetermined value α, the air flow rate is controlled to further decrement by ΔF from $F_2$ to $F_1$ as shown in FIG. 6, and the program repeats Steps S5, S7, S9, in which the air flow rate is decremented by ΔF per a program period.

When the temperature rise rate dT/dt exceeds the predetermined value α due to the air flow rate being decreased, whether or not the temperature rise rate dT/dt at the trap front exceeds the predetermined value β is checked (Step S6), and if it does not exceed the predetermined value β, that is the temperature rise rate dT/dt is confined between α-β in FIG. 3, the program will proceed to Step S9 at which whether or not the front temperature reaches the predetermined ignition value is checked and the program will execute Steps S5, S6 and S9 until it reaches the predetermined ignition value.

On the other hand, if the temperature rise rate dT/dt of the trap front temperature exceeds β while the front temperature is reaching the predetermined ignition value, the air flow rate is incremented by ΔF in Step S8 per a program period along $F_1 \rightarrow F_2 \rightarrow F_3$ as shown in FIG. 6 in the reverse direction as Step S7. This suppresses the temperature rise rate dT/dt while the trap front temperature is increased up to the predetermined ignition value.

After this, a conventionally used regeneration process will be executed, in which when the trap front temperature reaches the predetermined ignition value (Step S9), the electric heater 3 is made OFF so that the air flow rate of the air pump 6 is fixed at a preferable predetermined value for maintaining the igniting condition (Step S10).

Then, when a predetermined time interval has lapsed from the time the heater was made OFF (Step S11), the air pump 6 is made OFF (Step S12), and subsequently the bypass valve 9 is closed, the trap inlet valve 7 is opened, and the program ends (Step S13).

The program will again return to the trapping condition.

Thus, since a regeneration system for a particulate trap according to the present invention is arranged such that the introduction air amount be controlled so that the temperature rise rate of an electric heater may be confined within a predetermined range, the ignition for particulates can be hastened without damaging the trap.

What is claimed is:

1. A regeneration system for a particulate trap provided in an exhaust pipe of an engine, comprising;
    sensing means for sensing the temperature at the front of said trap,
    an air pump for supplying air flow for the front of said trap,
    heating means for electrically heating said trap, and,
    control means for energizing said heating means and said air pump upon the regeneration of said trap and then for calculating the temperature rising rate of the front temperature of said trap from the output of said sensing means to control the air flow from said air pump so that said temperature rising rate may be confined within a predetermined range, thereby raising the front temperature of said trap up to a predetermined ignition value.

2. A regeneration system for a particulate trap provided in an exhaust pipe of an engine according to claim 1, wherein said control means deenergizes said heating means and fixes the air flow from said air pump at a predetermined value when the front temperature of said trap reaches the predetermined ignition value.

3. A regeneration system for a particulate trap provided in an exhaust pipe of an engine according to claim 2, wherein said control means deenergizes said air pump when a predetermined time interval has lapsed after said heating means had been deenergized.

4. A regeneration system for a particulate trap provided in an exhaust pipe of an engine according to claim 1, further comprising pressure sensing means for sensing the pressure difference between the front pressure and the rear pressure of said trap, said control means initiating the regeneration of said trap when the pressure difference sensed by said pressure sensing means exceeds a predetermined value.

5. A regeneration system for a particulate trap provided in an exhaust pipe of an engine according to claim 4, further comprising:
    an inlet valve provided at the front of said trap in the exhaust pipe; and
    a bypass valve provided in a bypass pipe across said trap, said control means closing said inlet valve and opening said bypass valve when the regeneration of said trap is initiated, while opening said inlet valve and closing said bypass valve when the regeneration of said trap is completed.

* * * * *